United States Patent
Fu et al.

(10) Patent No.: US 10,582,410 B2
(45) Date of Patent: Mar. 3, 2020

(54) PREDICTING DOWNLINK THROUGHPUT

(71) Applicant: TELEFONAKTIEBOLAGET LM ERICSSON (PUBL), Stockholm (SE)

(72) Inventors: Jing Fu, Stockholm (SE); Steven Corroy, Stockholm (SE); Liyi Meng, Stockholm (SE)

(73) Assignee: TELEFONAKTIEBOALGET LM ERICSSON (PUBL), Stockholm (SE)

( * ) Notice: Subject to any disclaimer, the term of this patent is extended or adjusted under 35 U.S.C. 154(b) by 253 days.

(21) Appl. No.: 15/527,915

(22) PCT Filed: Nov. 20, 2014

(86) PCT No.: PCT/EP2014/075200
§ 371 (c)(1),
(2) Date: May 18, 2017

(87) PCT Pub. No.: WO2016/078723
PCT Pub. Date: May 26, 2016

(65) Prior Publication Data
US 2018/0317119 A1    Nov. 1, 2018

(51) Int. Cl.
*H04W 28/02* (2009.01)
*H04L 12/911* (2013.01)
(Continued)

(52) U.S. Cl.
CPC ....... *H04W 28/0252* (2013.01); *H04L 47/127* (2013.01); *H04L 47/30* (2013.01);
(Continued)

(58) Field of Classification Search
CPC ....... H04L 25/061; H04L 45/00; H04L 47/10; H04L 65/80; H04W 28/0252; H04W 28/0273; H04W 28/0289; H04W 80/04
See application file for complete search history.

(56) References Cited

U.S. PATENT DOCUMENTS

2005/0220097 A1*  10/2005  Swami ............... H04L 47/10
                                                                370/389
2008/0068999 A1*  3/2008   Ishii ................. H04L 47/14
                                                                370/235
(Continued)

FOREIGN PATENT DOCUMENTS

EP     2763472 A1     8/2014
WO  2007044255 A1     4/2007
(Continued)

OTHER PUBLICATIONS

International Search Report and Written Opinion issued in Application No. PCT/EP2014/075200 dated Jul. 22, 2015, 10 pages.

*Primary Examiner* — Michael Thier
*Assistant Examiner* — Prince A Mensah
(74) *Attorney, Agent, or Firm* — Rothwell, Figg, Ernst & Manbeck, P.C.

(57) ABSTRACT

An apparatus comprising a buffer estimation module for estimating if a base station has data buffered for a mobile communication device is provided. The apparatus further comprises a scheduling estimation module for determining how frequently the mobile communication device has been scheduled to receive data from the base station, a radio quality module for determining a radio quality indication of a communication channel between the mobile communication device and the base station, and a throughput estimation module for predicting downlink throughput from the base station to the mobile communication device based on at least output from the buffer estimation module, the frequency estimation module and the radio quality module.

20 Claims, 12 Drawing Sheets

(51) Int. Cl.
    *H04L 12/835*     (2013.01)
    *H04L 12/801*     (2013.01)
    *H04W 24/08*     (2009.01)

(52) U.S. Cl.
    CPC ........... *H04L 47/823* (2013.01); *H04W 24/08* (2013.01); *H04W 28/02* (2013.01); *H04W 28/0273* (2013.01); *H04W 28/0289* (2013.01)

(56) References Cited

U.S. PATENT DOCUMENTS

| | | | | |
|---|---|---|---|---|
| 2008/0192748 A1* | 8/2008 | Kim | ........................ | H04L 45/00 370/394 |
| 2011/0128867 A1* | 6/2011 | Tian | ................... | H04B 7/18543 370/252 |
| 2011/0130098 A1* | 6/2011 | Madan | ................... | H04W 24/02 455/63.1 |
| 2012/0188989 A1* | 7/2012 | Yokota | ................... | H04L 1/0002 370/336 |
| 2012/0287876 A1* | 11/2012 | Kazmi | ................... | H04B 7/022 370/329 |
| 2013/0150024 A1* | 6/2013 | Burbidge | .............. | H04W 76/19 455/423 |
| 2014/0071869 A1* | 3/2014 | Mathew | ................ | H04W 52/02 370/311 |

FOREIGN PATENT DOCUMENTS

| | | |
|---|---|---|
| WO | 2010066855 A1 | 6/2010 |
| WO | 2012107907 A1 | 8/2012 |
| WO | 2012118414 A1 | 9/2012 |

\* cited by examiner

PREDICTING DOWNLINK THROUGHPUT

CROSS REFERENCE TO RELATED APPLICATION(S)

This application is a 35 U.S.C. § 371 National Stage of International Patent Application No. PCT/EP2014/075200, filed Nov. 20, 2014, designating the United States, the disclosure of which is incorporated by reference.

TECHNICAL FIELD

The present embodiments relate to predicting downlink throughput from a base station to a mobile communication device.

BACKGROUND

It is known to provide user equipments (UE) such as mobile communication devices that are configured to connect to a mobile communication network in order to transmit and receive data. The user experience of connecting to a mobile communication network depends on various factors such as the configuration of the UE as well as the configuration of the network. Parameters indicating the user experience include network load, cell load and downlink throughput.

Although congestion control is taken in upper layers such as transport layer, a UE, not aware of the cell load, may connect to a cell and initiate transmission regardless of its load. This means that the initiated session may receive poor performance due to the offered low downlink throughput from the base station to the UE, for example starting a video conference even though the available downlink throughput is far less than satisfactory.

When a UE wants to initiate data transmission in a mobile communication network, either by actively starting a new service session, such as downloading a webpage or a file, or by a background process such as automatic software update, then information about the cell load would be beneficial before initiating transmission so as to improve performance.

It is known to provide methods for estimating end-to-end throughput as described in WO2012118414. Such a method involves the UE initiating a service session with a server and wait until the session reaches its maximum throughput. Alternatively, a UE that is switching from a first server to a second server, may base the throughput of the new communication channel with the second server on the throughput previously established when it was communicating with the first server. Therefore, these known methods estimate end-to-end throughput and do so only after a UE has already initiated a service session.

It is also known from WO2010066855 to provide a method for the UE to estimate throughput of a communication channel. In this method, the UE actively probes the network. It does so by putting data packets in a queue so that it always has something to send. The other end host, for example a server, is also configured to continuously send data packets to the UE.

The UE and the server estimate throughput based on packet size, transmission time, receive time etc. A disadvantage with this method is that the UE always has to transmit at maximum speed in order to obtain an estimation of throughput which wastes network resources. Furthermore, because the method requires that both the UE and the server send packets, additional strain is put on the network compared to if only one end host would be used for analyzing throughput.

SUMMARY

It is an object of the invention to overcome or substantially alleviate at least one of the aforementioned problems.

In accordance with an aspect of the invention there is provided, an apparatus comprising a buffer estimation module for estimating if a base station has data buffered for a mobile communication device; a scheduling estimation module for determining how frequently the mobile communication device has been scheduled to receive data from the base station; a radio quality module for determining a radio quality indication of a communication channel between the mobile communication device and the base station; and a throughput estimation module for predicting downlink throughput from the base station to the mobile communication device based on at least output from the buffer estimation module, the frequency estimation module and the radio quality module.

In one embodiment, the buffer estimation module for estimating if the base station has data buffered for the mobile communication device is for analyzing a radio link control protocol data unit RLC PDU.

In another embodiment, the buffer estimation module is for analyzing a bit of the RLC PDU which is indicative of an end of a packet data convergence protocol service data unit PDCP SDU.

In yet another embodiment, the buffer estimation module is for estimating if the base station has data buffered for the mobile communication device by analyzing transmission control protocol TCP and/or user datagram protocol UDP flow from the base station to the mobile communication device.

In an alternative embodiment, the buffer estimation module comprises a TCP sub-module and/or a UDP sub-module for detecting partially received transmission control protocol packets and user datagram protocol packets respectively.

The buffer estimation module may further comprise an aggregation sub-module for aggregating output from the TCP and UDP sub-modules to provide a probability of the base station having data in buffer for the mobile communication device.

In one embodiment, the scheduling estimation module is for determining how frequently the base station has scheduled the mobile communication device to receive data from the base station by analyzing the previous downlink scheduling information and determining whether the mobile communication device has been scheduled.

In another embodiment, the scheduling estimation module is for determining a proportion of physical resource blocks assigned to the mobile communication device when it has been scheduled.

In a further embodiment, the radio quality indication comprises signal to interference plus noise ratio (SINR) and rank value.

In yet another embodiment, the throughput estimation module is for developing a prediction model for predicting downlink throughput from the base station to the mobile communication device.

The apparatus may further comprise a load estimation module configured to estimate cell load information of the base station.

In one embodiment, the cell load information comprises a value indicative of available capacity of a cell of the base station.

In another embodiment, the load estimation module receives input from the buffer estimation module and the scheduling estimation module.

In yet another embodiment, the load estimation module is configured to develop a prediction model for estimating cell load information based on input from the buffer estimation module and the scheduling estimation module.

In a further embodiment, the throughput estimation module is for predicting downlink throughput from the base station to the mobile communication device based on the cell load information.

In one embodiment, the apparatus is a mobile communication device.

In accordance with another aspect of the invention, there is provided a mobile communication device comprising the apparatus claimed in appended claims 1 to 15.

In accordance with another aspect of the invention, there is provided an apparatus to predict downlink throughput in a mobile communication network comprising a processor, and a memory, said memory containing instructions executable by said processor, whereby the apparatus is operative to; determine a data buffer indication by estimating if a base station has data buffered for a mobile communication; determine a scheduling indication comprising how frequent the mobile communication device has been scheduled to receive data from the base station; estimate radio quality by determining radio quality information of a communication channel between the mobile communication device and the base station; and predict downlink throughput from the base station to the mobile communication device based on at least the data buffer indication, frequency of scheduling and radio quality information.

In one embodiment, the apparatus is operative to estimate if the base station has data buffered for the mobile communication device by analyzing a radio link control protocol data unit RLC PDU.

In another embodiment, the apparatus is operative to estimate a bit of the RLC PDU which is indicative of an end of a packet data convergence protocol service data unit PDCP SDU is analyzed.

In yet another embodiment, the apparatus is operative to analyze transmission control protocol TCP and/or user datagram protocol UDP flow from the base station to the mobile communication device so as to estimate if the base station has data buffered for the mobile communication device.

In a further embodiment, the apparatus is operative to aggregate output from the TCP and UDP flow to provide a probability of the base station having data in buffer for the mobile communication device.

In one embodiment, the apparatus is operative to determine the scheduling indication comprises analyzing previous downlink scheduling information and determining whether the mobile communication device has been scheduled.

In another embodiment, the apparatus is operative to estimate previous downlink scheduling information so to determine a proportion of physical resource blocks assigned to the mobile communication device when it has been scheduled.

The apparatus may also be operative to determine signal to interference plus noise ratio (SINR) and rank value so as to estimate the radio quality information.

In one embodiment, the apparatus is operative to develop a prediction model for prediction downlink throughput from the base station to the mobile communication device.

In another embodiment, the apparatus is operative to determine cell load information based on the data buffer indication and the scheduling indication.

In yet another embodiment the apparatus is operative to determine a prediction model for estimating cell load information based on the data buffer indication and the scheduling indication.

In a further embodiment, the apparatus is operative to predict downlink throughput from the base station based on the cell load information and the radio quality information.

In accordance with yet another aspect of the invention, there is provided a method of predicting downlink throughput in a mobile communication network by determining a data buffer indication by estimating if a base station has data buffered for a mobile communication device; determining a scheduling indication of how frequently the mobile communication device has previously been scheduled to receive data from the base station; estimating radio quality by determining a radio quality information of a communication channel between a mobile communication device and a base station; and predicting downlink throughput from the base station to the mobile communication device based on at least the data buffer indication, scheduling indication, and radio quality information.

In one embodiment, the method further comprises estimating if the base station has data buffered for the mobile communication device by analyzing a radio link control protocol data unit RLC PDU.

In another embodiment, a bit of the RLC PDU which is indicative of an end of a packet data convergence protocol service data unit PDCP SDU is analyzed.

In yet another embodiment, the method further comprises analyzing transmission control protocol TCP and/or user datagram protocol UDP flow from the base station to the mobile communication device so as to estimate if the base station has data buffered for the mobile communication device.

In a further embodiment, the method may further comprise aggregating output from the TCP and UDP flow to provide a probability of the base station having data in buffer for the mobile communication device.

In one embodiment, the method comprises determining the scheduling indication comprises analyzing previous downlink scheduling information and determining whether the mobile communication device has been scheduled.

In another embodiment, the method further comprises analyzing previous downlink scheduling information so to determine a proportion of physical resource blocks assigned to the mobile communication device when it has been scheduled.

The method may further comprise determining signal to interference plus noise ratio (SINR) and rank value so as to estimate the radio quality information.

In one embodiment, the method further comprises developing a prediction model for prediction downlink throughput from the base station to the mobile communication device.

In another embodiment, the method further comprises determining cell load information based on the data buffer indication and the scheduling indication.

In yet another embodiment, the method further comprises developing a prediction model for estimating cell load information based on the data buffer indication and the scheduling indication.

In a further embodiment, the method further comprises predicting downlink throughput from the base station based on the cell load information and the radio quality information.

In accordance with yet another aspect of the invention, there is provided a computer program comprising instructions which when executed on at least one processor, cause the at least one processor to carry out the method according to any of claims 19 to 30 appended to the description.

In accordance with a further aspect of the invention, there is provided a computer storage medium containing program instructions for predicting downlink throughput in a mobile communication network, wherein execution of the program instructions by one or more processors of a computer system causes the one or more processors to carry out the method according to any of the claims 19 to 30 appended to the description.

In accordance with another aspect of the invention, there is provided a carrier comprising a computer program of claims 19 to 30, wherein said carrier is one of an electronic signal, an optical signal, an electromagnetic signal, a magnetic signal, an electric signal, a radio signal, a microwave signal, or a computer-readable storage medium.

Embodiments of the invention will now be described, by way of example only, with reference to the accompanying drawings, in which.

DESCRIPTION

Figure 1:
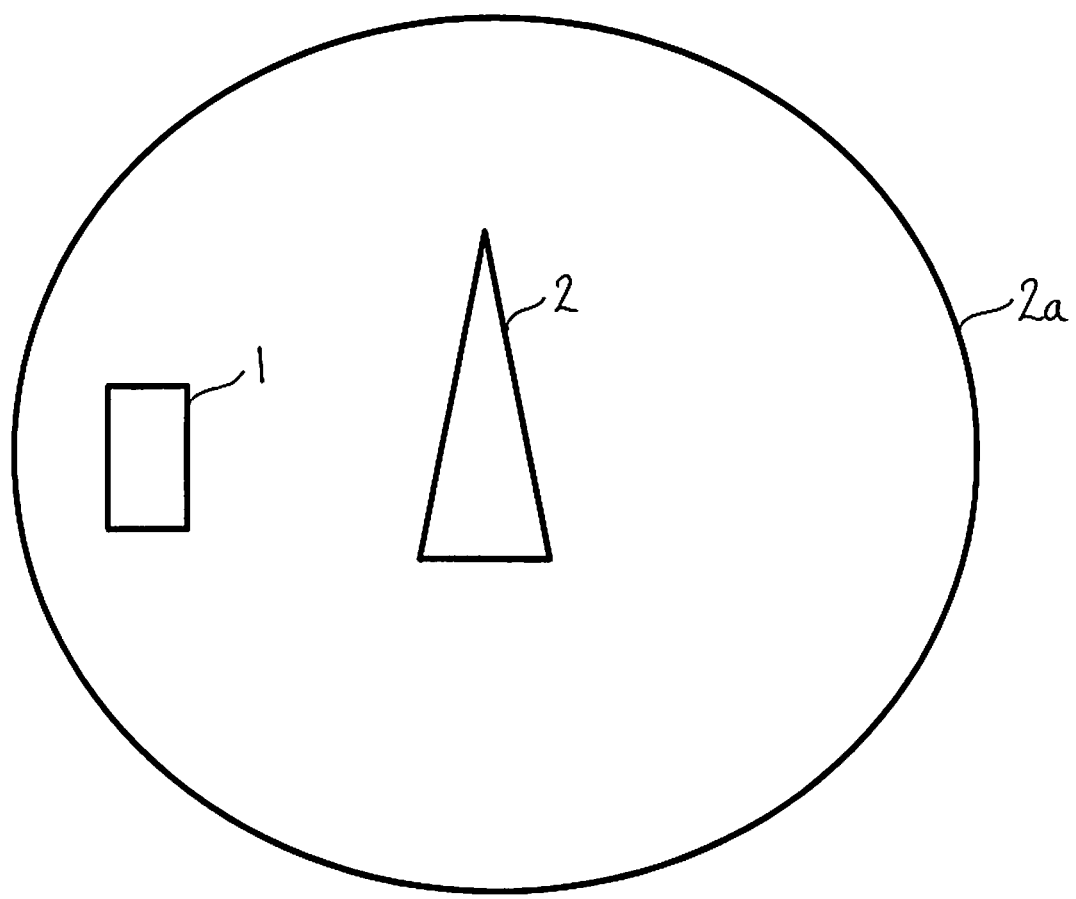
FIG. 1 shows a schematic illustration of an embodiment of a mobile communication device according to the present invention and a base station.

Referring now to the drawings it should be realized that according to one embodiment of the invention, a mobile communication device 1 or a component 3 thereof is provided, and said mobile communication device or component is for predicting or estimating downlink throughput received from a base station forming part of a mobile communication network.

The term "downlink throughput" used herein is to be understood as the rate of successful data delivered over a communication channel from an end host such as a server to a UE.

In another embodiment, the mobile communication device 1 or a component 3 thereof is also for predicting or estimating cell load of a cell of a base station with which a mobile communication device wishes to connect. The estimated cell load can be used by the mobile communication device 1 to estimate downlink throughput. The term "cell load" used herein is to be understood as the load of a particular cell of a base station, this may be expressed as number of users of said particular cell.

The estimated cell load and downlink throughput can be used to control how the mobile communication device 1 initiates service sessions and provide input to mobile communication device applications and/or the user. One of the main advantages of the embodiments described herein is that the mobile communication device or the component 3 can predict or estimate downlink throughput before it initiates and starts sending data to a base station.

The embodiments of the invention will now be described in more detail with reference to the drawings. For simplicity, unless otherwise detailed, the same reference numerals are used to designate like features in the different embodiments described herein.

Referring now to FIG. 1, the mobile communication device 1, a base station 2 and its cell 2a are shown. The mobile communication device 1 may be a user equipment (UE), such as a mobile phone, smart phone, computer, laptop, tablet or any other user equipment capable of connecting and sending and receiving data with a base station. The mobile communication device 1 may alternatively be a device that is configured to automatically connect to, send and receive data with a base station, without any direct user input. An example of such a device may be a constrained device. The base station 2 is an E-UTRAN Node B (eNodeB) which together with other eNodeBs (not shown) form an Evolved Universal Terrestrial Radio Access Network (E-UTRAN). The eNodeB is connected to an Evolve Packet Core (EPC) (not shown). The eNodeB communicates wirelessly with the mobile communication device 1.

Figure 2:
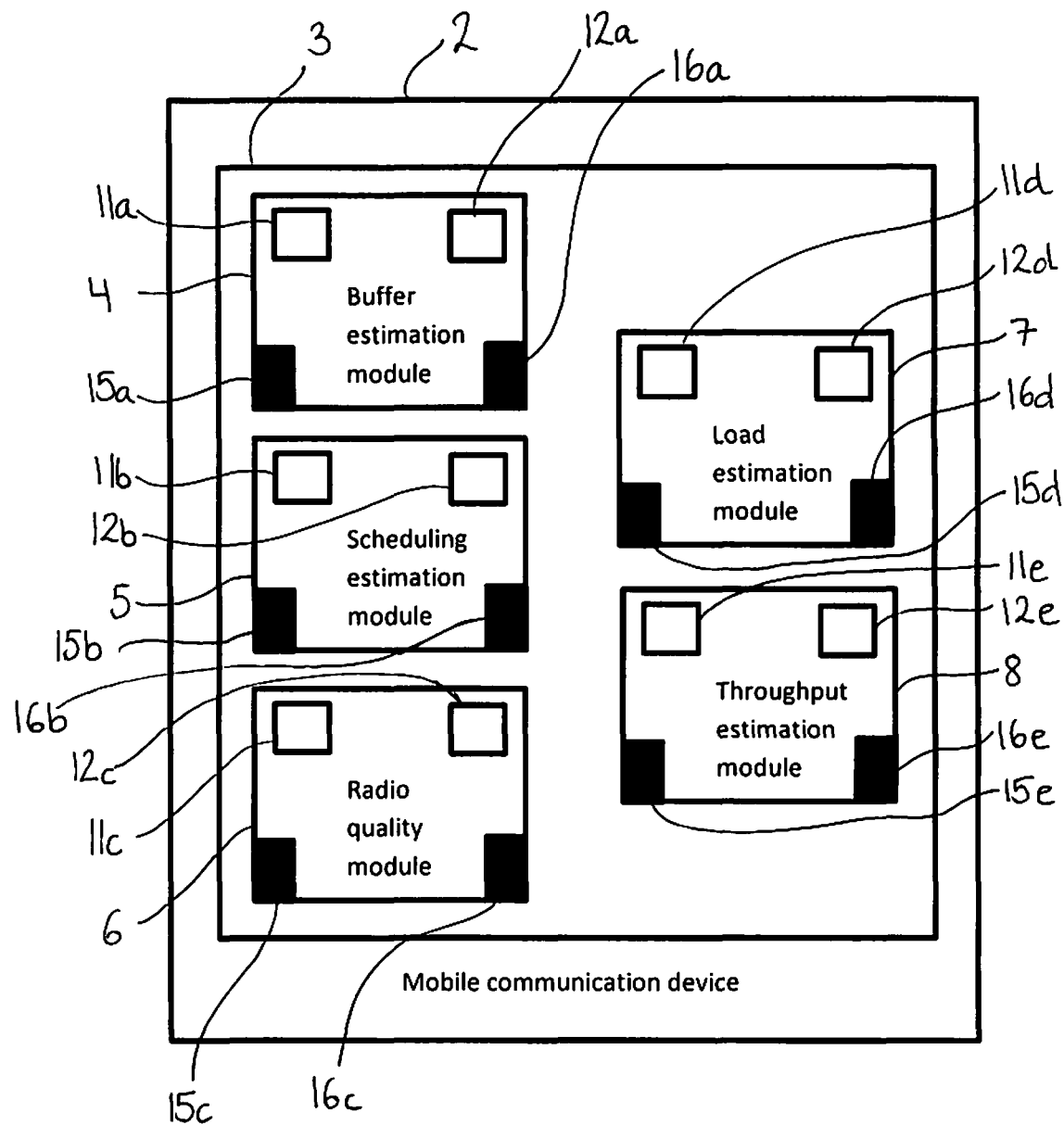
FIG. 2 shows a schematic illustration of an embodiment of a mobile communication device of the present invention.

Referring now to FIG. 2, the mobile communication device 1 is shown comprising an apparatus or a component 3. The component 3 is configured to predict or estimate downlink throughput from a base station forming part of a mobile communication network. In an alternative embodiment, the component 3 may be configured to predict or estimate cell load of a cell of a base station with which a mobile communication device wishes to connect. The estimated cell load can further be used by the mobile communication device 1 to estimate the downlink throughput from a base station. This will now be explained in more detail.

The component comprises a buffer estimation module 4 for estimating if a base station has data buffered for a mobile communication device, a scheduling estimation module 5 for determining how frequently the mobile communication device has been scheduled to receive data from the base station, a radio quality module 6 for determining a radio quality indication of a communication channel between the mobile communication device and the base station; and a throughput estimation module 8 for predicting downlink throughput from the base station to the mobile communication device based on at least output from the buffer estimation module, the frequency estimation module and the radio quality module.

In one embodiment, the component 3 further comprises a load estimation module 7 as seen in FIG. 2. In another embodiment, the throughput estimation module 8 comprises the load estimation module 7.

Figure 3:
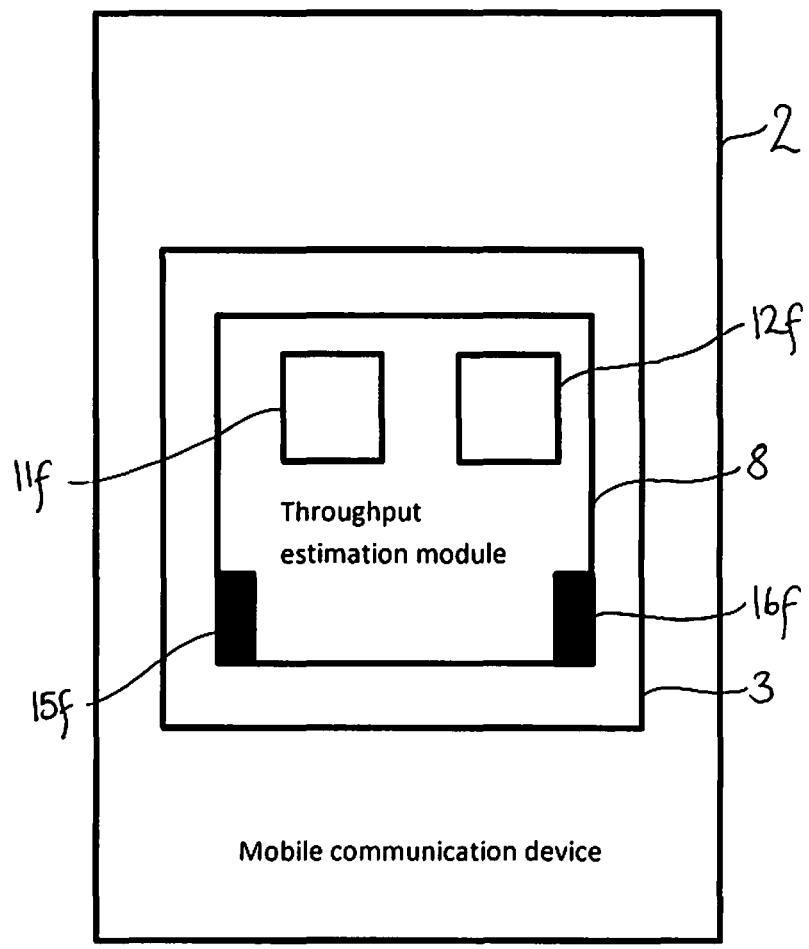
FIG. 3 shows another schematic illustration of an embodiment of a mobile communication device of the present invention.

Schematically the buffer estimation module 4, the scheduling estimation module 5, the radio quality module 6, the load estimation module 7 and the throughput estimation module 8 are described as separate different modules as seen in FIG. 2, however in an alternative embodiment they may form part of the same module as seen in FIG. 3 which shows the component 3 comprising a throughput estimation module 10 configured to carry out the functions of the buffer estimation module 4, the scheduling estimation module 5, the radio quality module 6 and the load estimation module 7 described with reference to FIG. 2. It should be understood that the present invention is not limited to these two configurations and that any of the modules may be integrated or separated from one another.

The buffer estimation module 4, the scheduling estimation module 5, the radio quality module 6, the load estimation module 7 and the throughput module 8 may be implemented in software, such as a computer program, or in hardware. Alternatively, the modules could be implemented in software and hardware.

FIG. 2 illustrates an embodiment of a hardware implementation where the buffer estimation module 4, the scheduling estimation module 5, the radio quality module 6 and the load estimation module 7 and the throughput module 8 each comprises a memory 11a, 11b, 11c, 11d and 11e, and a processor 12a, 12b, 12c, 12d and 12e. Each memory stores computer program instructions of its particular module that are executable by the processor of each particular module. Furthermore, each module comprises a data input 15a, 15b, 15c, 15d for receiving data and 15e and a data output 16a, 16b, 16c, 16c, 16d and 16e for transmitting data.

FIG. 3 illustrates an alternative hardware implementation module where the component 3 comprises the throughput estimation module 10 having a memory 11f and a processor 12f. The memory 11f stores computer program instructions of the buffer estimation module, scheduling estimation module, radio quality module, load estimation module which is optional, and the throughput estimation module, and the instructions are executable by the processor 12f. The component 3 further comprises a data input 15f for receiving data and a data output 16f for transmitting data.

Figure 4:
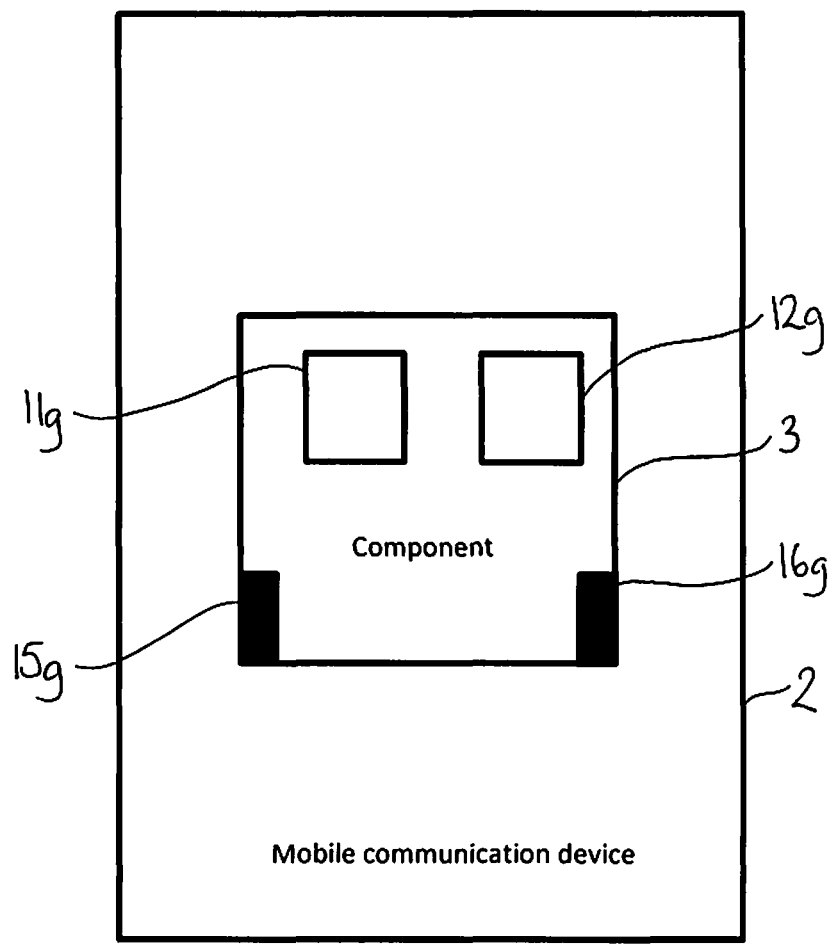
FIG. 4 shows yet another schematic illustration of an embodiment of a mobile communication device of the present invention.

In an alternative embodiment shown in FIG. 4, the component 3 comprises a memory 11g and a processor 12g and the buffer estimation module 4, the scheduling estimation module 5, the radio quality module 6, the load estimation module 7 which is optional, and the throughput estimation module 8 are computer software instructions stored in the memory 11g and executable by the processor 12g. The component comprises a data input 15g for receiving data and a data output 16g for transmitting data.

It should be understood that any reference to a processor herein is not limited to a single processor, it may include one or more processor or processing units. In one embodiment, a processor should also be understood to comprise a processor arrangement.

Furthermore, in an alternative embodiment of the present invention, at least some of the steps, functions, procedures and/or modules described herein may be implemented in software such as a computer program for execution by suitable processing circuitry such as one or more processors or processing units.

The buffer estimation module 4, the scheduling estimation module 5, the radio quality module, the load estimation module and the throughput estimation module will now be described in more detail.

Buffer Estimation Module

The buffer estimation module 4 is for estimating if a base station has data buffered for the mobile communication device 1 at each transmission time interval (TTI) or for a number of TTIs. Such data may be buffered in a buffer unit (not shown) of a base station. The mobile communication device 1 bases its estimation on data information provided by the radio link control (RLC) layer, or the Transmission Control Protocol and User Datagram Protocol (TCP/UDP) of the transport layer as will be explained in more detail below. The output data of the buffer estimation module 4 is referred to as data buffer indication and it could be binary, where in each TTI, the output data is in the form of "yes" or "no" as to whether the base station has data buffered for the mobile communication device 1. Alternatively, the output data could be a number representing a probability of data being buffered at the base station. For example, the output could be a number between 0 and 1, and there can be a cut off point for example 0.5 where 0-0.49 is interpreted as no data in buffer, and 0.5-1 as data in buffer.

In one embodiment, the buffer estimation module 4 is configured to estimate whether the base station has data buffered for the mobile communication device 1 based on data formatted by the RCL layer of the base station. The RCL layer forms part of the protocol stack layers in Long Term Evolution (LTE) and is located between the packet data convergence protocol (PDCP) layer and medium-access control (MAC) layer. In a base station, these layers prepare data for the physical layer so that it can be transmitted via the base station and air interface to the mobile communication device. A detailed explanation of the LTE protocol stack has been omitted as it is well known in the art, for example [TS 25.201, TS 36.401].

Figure 5:
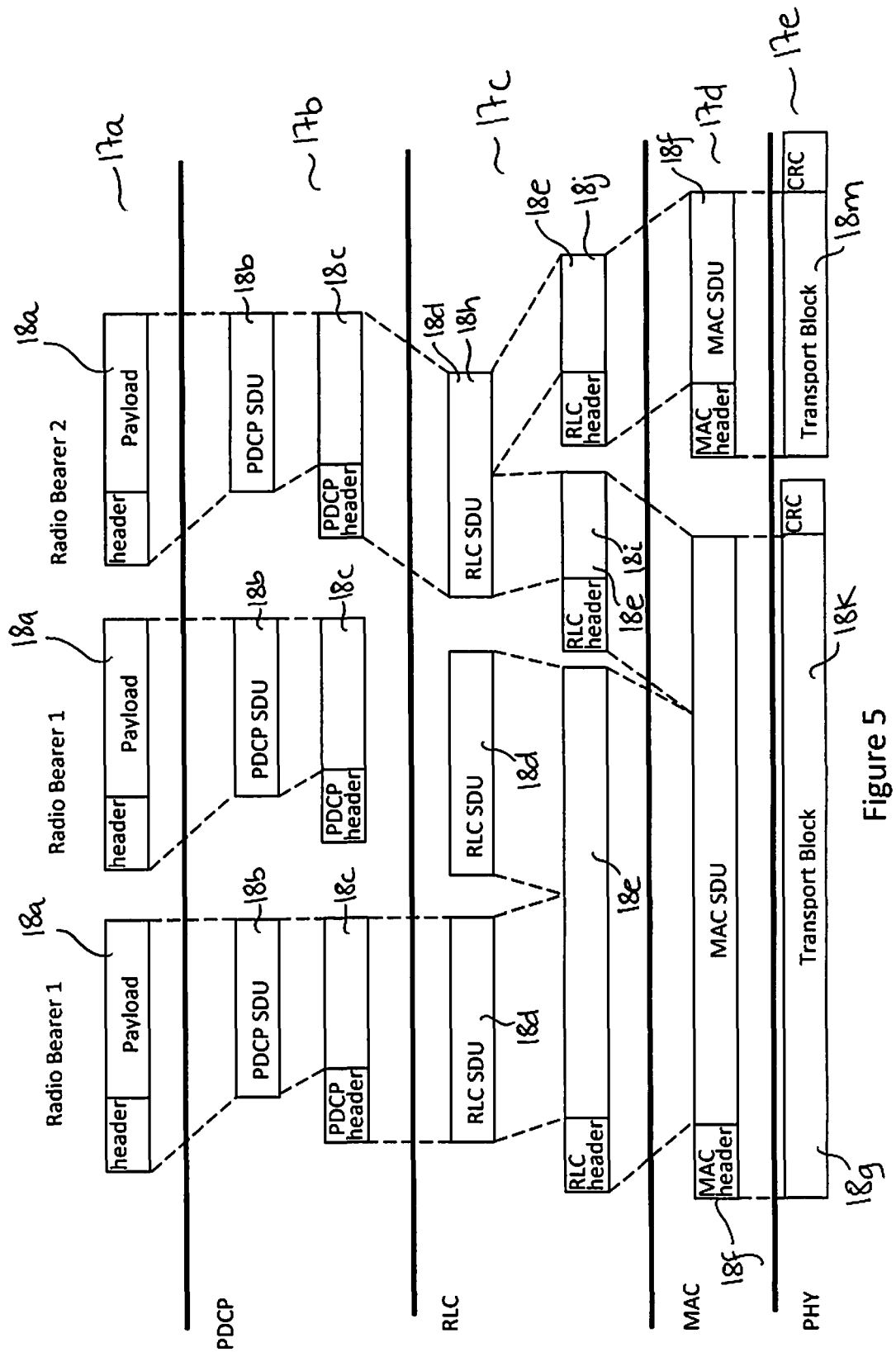
FIG. 5 shows an example of Long Term Evolution (LTE) data flow.

However, for the sake of clarity, the data flow in the lower layers of the LTE protocol stack will now be briefly described in relation to a base station with reference to FIG. 5 which shows five layers; Internet protocol (IP) layer 17a, Packet Data Convergence Protocol (PDCP) layer 17b, Radio link convergence (RLC) layer 17c, Media access control (MAC) layer 17d and Physical (PHY) layer 17e. IP packets 18a are received and input to the PDCP layer 17b. The IP packets 18a are received by the PDCP layer 17b as PDCP Service Data Units (PCDP SDUs) 18b. The PDCP layer 17b is mainly responsible for header compression and ciphering of the PDCP SDUs 18b and the packet output of this layer is referred to as PDCP Protocol Data Units (PDCP PDUs) 18c. The PDCP layer transmits the PDCP PDUs 18c to the RCL layer 17c and the RLC layer 17c receives the PDCP PDUs 18c as RCL Service Data Units (RLC SDUs) 18d. The RLC layer 17c may transfer the RCL SDUs 18d directly or it may perform segmentation and/or concatenation before transmission. The RLC layer 17c outputs RLC Protocol Data Units (RLC PDUs) 18e which are transmitted to the MAC layer 17d. The MAC layer receives the RLC PDUs 18e as MAC Service Data Units (MAC SDUs) 18f. The MAC layer performs multiplexing by adding headers and dose padding to the MAC SDUs 18f if needed so as to fit each MAC SDUs 18f in a TTI. Thereafter, the data packets are transmitted as MAC Protocol Data Units (MAC PDUs) (not shown) to the physical layer 17e. The physical layer 17e transmits the data as transport blocks 18g through physical channels to the mobile communication device via the air interface.

Looking further into the RLC layer 17c, one of its functions is to perform segmentation and concentration of the data units. There are three transfer modes in the RLC layer 17c: Transparent Mode (TM), Unacknowledged Mode (UM) or Acknowledged Mode (AM). In TM, RLC SDUs 18d will be packed into RLC PDUs 18e and transmitted directly (i.e. no segmentation and/or concatenation is performed). In UM and AM, the RLC layer breaks a RLC SDU 18d into multiple RLC PDUs 18e if the RLC SDU 18d is larger than the PDU size which is typically the size of transport block. If a RLC SDU 18d is smaller than a transport block size, then RLC layer 17e packs multiple RLC SDUs 18d into a single RLC PDU 18e.

In TM, RLC PDUs 18e contain only data, no header is added. In UM and AM mode an extra header is needed to be added to each RLC PDUs 18e before transmission. The header format is defined in standard 3GPP TS 136 322. Each RLC PDU 18e comprises a sequence number (SN) field and a framing info (FI) field. These fields mostly relate to segmentation and/or concatenation.

The SN field indicates the sequence number of each RLC PDU 18e. In AM, the SN field indicates the sequence number of the original RLC SDU 18d segment from which the RLC PDU 18e segment was constructed from. The sequence number is incremented by one for every RLC PDU 18e.

The FI field indicates whether a RLC SDU 18d is segmented at the beginning and/or at the end of the data field. The value of the field and its corresponding meaning is listed below.
- 00: First byte of the Data field corresponds to the first byte of a RLC SDU. Last byte of the Data field corresponds to the last byte of a RLC SDU.
- 01: First byte of the Data field corresponds to the first byte of a RLC SDU. Last byte of the Data field does not correspond to the last byte of a RLC SDU.
- 10: First byte of the Data field does not correspond to the first byte of a RLC SDU. Last byte of the Data field corresponds to the last byte of a RLC SDU.
- 11: First byte of the Data field does not correspond to the first byte of a RLC SDU. Last byte of the Data field does not correspond to the last byte of a RLC SDU.

By combining the information in both the SN and the FI fields, the RLC layer 17c in the mobile communication device 1 is able to determine if all segmentations are received, and how to rebuild the RLC SDU.

As mentioned above, there is a single bit in the RLC PDU 18e which indicates if the whole PDCP SDU 18b has been received. If this bit indicates that the last part of the RLC PDU 18e has not been received by the mobile communication device 1, i.e. the whole PDCP SDU 18b has not been received, then the buffer estimation module 4 estimates that there is more data buffered in the base station. The estimation is reliable as the base station has some unsent PDCP data in an additional RLC PDU 18e. Therefore, the buffer estimation module 4 may be configured such that if the transport block 18g does not include data from the end part of a RLC PDU 18e, then the buffer estimation module determines that there is more data in the buffer unit of the base station.

An example of the above scenario can be seen in FIG. 5, where the RLC SDU 18h to the right is segmented into two RLC PDUs 18i, 18j which are transmitted in two different transport blocks. In this particular example, upon receiving the first transport bock 18k in a TTI, the mobile communication device 1 according to the present invention successfully determines that the next RLC PDU 18j is buffered in the base station buffer and will be transmitted in the second transport block 18m.

In summary, this embodiment relates to the buffer estimation module 4 for estimating if the base station has data buffered for the mobile communication device by analyzing a RLC PDU. In particular, the buffer estimation module analyzes a bit of the RLC PDU which is indicative of an end packet of a PDCP SDU. If the RLC PDU bit indicates the end part of a PDCP SDU, and the transport block contains a full RLC PDU, then the buffer estimation module estimates that there is no more data in the buffer unit.

The alternative embodiment wherein the buffer estimation module 4 is for utilizing the TCP/UDP protocols of the transport layer in order to estimate whether there is any data buffered in base station will now be described with reference to FIG. 6.

In this embodiment, the buffer estimation module comprises three sub-modules: a TCP flow estimation sub-module, an UDP flow estimation sub-module and an aggregation sub-module. Each module will be described in more detail below, however briefly, the TCP flow estimation sub-module and the UDP flow estimation sub-module are used to estimate if the buffer unit of a base station has data buffered for a certain TCP/UDP flow by detecting partially received TCP and UDP packets respectively. The output of the TCP or the UDP flow is a probability that the buffer unit of the base station has data buffered. The aggregation sub-module is configured to aggregate the estimation from each TCP flow estimation and UDP flow estimation in order to provide an overall estimation as to whether data is buffered in the buffer unit of base station.

The TCP flow estimation sub-module will now be described in more detail. A TCP flow comprises a source IP, destination IP, source port and destination port. The TCP flow estimation sub-module monitors the traffic of each of these and estimates the probability that there is downlink traffic data already in queue at the base station. In more detail, the TCP flow estimation sub-module estimates whether the buffer unit of the base station has data buffered taking the following inputs for the estimation; collecting or receiving the number of bytes transmitted downlink for each TTI for a period of recent time, storing information of any TCP segment and part of TCP segment transmitted in each TTI transmission, collecting the unacknowledged bytes sent uplink at each TTI, storing previous estimations of the probability of downlink traffic, and monitoring the round trip time (RRT) of the TCP flow.

Using these inputs, a machine learning method can be used to estimate the probability of data in future TTIs. The machine learning algorithm learns the importance of different features automatically without human input.

It may be that a part of a TCP segment is received in the mobile communication device while the remaining TCP segment has not yet been received. In this case, the buffer estimation module 4 is certain that data is buffered in the buffer unit of the base station and that the base station has only transmitted a part of the data mobile communication device to resource limitations.

When a mobile communication device has unacknowledged uplink packets, it means that it will have some downlink acknowledgement messages (ACKs) in the future. However, the mobile communication device will be uncertain when the TCP ACK segment will be received by the base station. Therefore, other information such as RTT may be used as input to provide a more accurate prediction. For example, for a certain TCP flow, nearly all ACKs arrive 20 ms after the data packet. In a particular TTI, if the ACK for an uplink packet has not arrived after 20 ms, it can be assumed that the buffer unit of the base station has data buffered for the mobile communication device.

Similar to TCP flow estimation sub-module, the UDP flow estimation sub-module monitors UDP traffic. This sub-module estimates if there is data in the buffer unit of a base station for different UDP flows. Similar to the TCP flow estimation sub-module, the UDP flow estimation sub-module is configured to detect partially received UDP packets. A partially received UDP packet indicates that there is data in the buffer unit of a base station for this flow.

In addition to this, for each flow, the UDP flow estimation sub-module may be configured to analyze previous arrival times of UDP packets, and based on the analysis predict whether there are packets in the buffer unit of a base station. As an example where a UDP flow is voice over IP (VoIP), if the mobile communication device has identified that there are VoIP packets every 20 ms, then it knows that the base station has data in buffer for it every 20 ms.

The buffer estimation may further comprise a flow aggregation estimation sub-module which aggregates the individual data in buffer estimation from multiple TPC and UDP flows. Based on the information from different flows, it provides an aggregated estimation of the probability of data in buffer at the base station for a particular mobile communication device. Mathematically, if individual flows have a probability of P1, P2, P3, Pn of having data in buffer at a base station, then the probability of any flow having data in buffer can be computed as;

$$P=1-(1-P1)\times(1-P2)\times(1-P3)\ldots\times(1-Pn)$$

In this embodiment, the buffer estimation module 4 could be configured to rely on one sub-module or a combination of sub-modules in order to provide an estimation of whether data is buffered in the buffer unit of the base station.

In summary for this embodiment, the buffer estimation module 4 is for estimating if the base station has data buffered for the mobile communication device 1 by analyzing TCP and/or UDP flow from the base station to the mobile communication device. The buffer estimation module may do so by a TCP sub-module and/or a UDP sub-module configured to detect partially received transmission TCP packet(s) and/or UDP packet(s), respectively. The buffer estimation module 4 may further comprise an aggregation sub module for aggregating output from the TCP and UDP sub-modules to provide a probability of the base station having data in buffer for the mobile communication device 1.

Furthermore, in an embodiment where the buffer estimation module 4 is hardware implemented, its data input 15a receives data information from the RLC layer, or alternatively the transport layer (TCP and/or UDP protocols). After the buffer estimation module 4 has processed the data information as described above, it transmits the data buffer indication to the data input 15d of the load estimation module 7 or the data input 15e of the throughput estimation module 8.

Additionally, in an alternative embodiment where the buffer estimation module 4 is software implemented data information from the RLC layer or transport layer (TCP and/or UPD protocol) is provided to the buffer estimation module 4 and the once the buffer estimation module 4 has processed the data information it provides the data buffer indication to the estimation module 7 or the throughput estimation module 8.

Scheduling Estimation Module

In LTE, data is downloaded from a base station (eNodeB) to a mobile communication device using orthogonal frequency division multiplexing (OFDM). This means that data is transmitted from the base station to the mobile communication device over many narrow band sub-carriers, each 15 kHz wide, instead of having one single wide band carrier of 5 MHz as is known for wideband code division multiple access (W-CDMA). In LTE, OFDM resource blocks are dynamically assigned both in a time domain and a frequency domain to each mobile communication device for downlink transmission. A downlink scheduler is responsible for scheduling or assigning resource blocks to a mobile communication device in Transmission Time Interval (TTI). The downlink scheduler allocates network resources so as to optimize the experience of each mobile communication device connected to a particular base station. Each mobile communication device will have a different channel gain on different resource blocks and a resource block might be more valuable for some mobile communication devices than others.

In the present invention, an embodiment of the scheduling estimation module 5 receives the previous downlink scheduling information about the mobile communication device in each TTI, or for a number of TTIs. The scheduling estimation module 5 analyzes and configures the data such that its output is in the form of scheduling indication for each TTI, or for a number of TTIS, a binary output as to whether the mobile communication device has been scheduled. The scheduling indication may also include the share, proportion or percentage of physical resource blocks that are scheduled to that particular mobile communication device by the base station.

Figure 6:
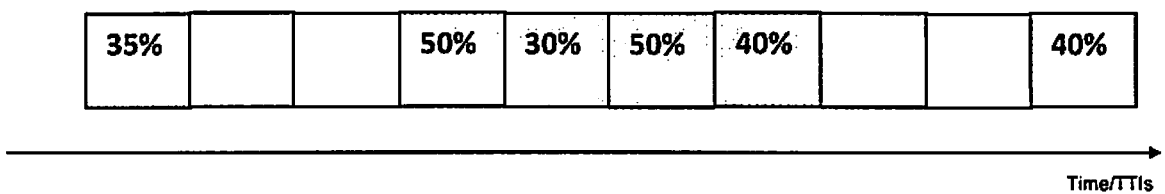
FIG. 6 shows a schematic illustration of output, scheduling indication, from a scheduling estimation module.

FIG. 6 shows an illustration of scheduling information along an axis of TTIs for the mobile communication device 1. Each box represents a TTI and a shaded box indicates that in that TTI the mobile communication device 1 was scheduled, and the percentage within that box indicates the percentage of physical resource blocks scheduled to that particular mobile communication device in that TTI. An empty non-shaded box indicates that no resource blocks were scheduled to that particular mobile communication device 1 at that particular TTI.

The scheduling estimation module 5 thereby determines the frequency that a particular mobile communication device is scheduled by a base station.

The scheduling estimation module 5 sends or provides the scheduling indication to the load and throughput estimation module or the throughput estimation module as is explained in more detail below.

In an embodiment where the scheduling estimation module 5 is hardware implemented, its data input 15b receives previous scheduling information and after it has processed the scheduling information as described above, it transmits the scheduling indication to the data input 15d of the load estimation module 7 or the data input 15e of the throughput estimation module 8.

In an alternative embodiment where the scheduling estimation module 5 is software implemented scheduling information is provided to the scheduling estimation module 5 and once the scheduling estimation module 5 has processed the scheduling information it provides the scheduling indication to the estimation module 7 or the throughput estimation module 8.

In summary, the scheduling module is for determining how frequently the base station has scheduled the mobile communication device to receive data from the base station. The scheduling estimation module may do so by analyzing previous downlink scheduling information and determining whether the mobile communication device has been scheduled. The scheduling estimation module may also determine a proportion of physical resource blocks assigned to the mobile communication device when it has been scheduled.

Radio Quality Module

As way of background, a mobile communication device is configured to measure its signal quality (also referred to as channel quality or radio quality) with the base station at every TTI. The mobile communication device does so by using a reference signal sent by the base station to the mobile communication device. The mobile communication device calculates the signal to interference plus noise ratio (SINR) of the reference signal sent by the base station and uses the SINR to calculate a channel quality indicator (CaI). The CQI indicates how good or bad the communication channel quality is between the mobile communication device and the base station. The user equipment uses the CQI to map its value to a modulation and coding scheme (MSC). If the quality of the channel is good (the value of CQI) is high, the UE will use a high order modulation scheme with a high coding rate based on the MSC mapping.

The mobile communication device further transmits a channel state information (CSI) which includes the CQI to the base station at approximately every 40 ms, or on request from the base station. The eNodeB uses this information to decide which OFDM resource blocks should be assigned to the user equipment, however it may ignore the recommendation of the user equipment.

Rank is another important factor that highly influences the quality of communication of a mobile communication device and a base station. The rank value is also estimated based on the reference signal of the eNodeB. In a multiple antenna system, the rank value of a mobile communication device is the rank of the channel matrix from the mobile communication device to the base station. In a typical two by two multiple—input and multiple—output (MIMO) communication the rank value can be 1 or 2. A rank value of 1 means that the mobile communication device can send one stream at a time and a rank value of 2 means that the mobile communication device can transmit two orthogonal streams in parallel, resulting in a higher throughput.

A brief example of a method of how a mobile communication device estimates the radio quality of a communication channel between a mobile communication device and a base station, and how the base station uses the information will now be described.
1. In each TTI, the mobile communication device measures the radio quality by calculating the SINR, CQI and rank of the reference signal sent by the base station.
2. At a time, $T_r$, the mobile communication device transmits its channel state information (CSI) includes its CQI and Rank information to the base station.
3. The base station receives the CSI.
4. The base station processes the CSI and extracts the SINR and rank information.
5. Based upon the SINR and Rank, the base station takes a scheduling decision.

It should be appreciated that the present invention is not limited to this particular way of calculating the radio quality. Alternative ways of calculating the radio quality should also be realized.

According to the present invention, the mobile communication device or a component thereof, further comprises the radio quality module 6 for determining a radio quality indication of a communication channel between the mobile communication device and the base station. The radio quality module 6 receives and/or requests SINR and rank values determined by the mobile communication device or equivalent component. In an alternative embodiment, the SINR and the rank value is calculated by the quality radio module 6.

In an embodiment where the radio quality module 6 is hardware implemented, its data input 15*c* receives data information to calculate the radio quality information, SINR and rank value. Alternatively, the data input 15*c* receives the SINR and rank value. In both embodiments, the data output 16*c* of the radio quality module 6 transmits the radio quality information to the data input 15*e* of the throughput estimation module 8.

In an alternative embodiment where the radio quality module 6 is software implemented it provides the radio quality information to the throughput estimation module 8.

In summary, the radio quality module 6 is for determining a radio quality indication of a communication channel between the mobile communication device and the base station. The radio quality indication comprises SINR and rank value. The radio quality module may determine the radio quality indication for each TTI, or for a number of TTIs.

Load Estimation Module and Throughput Estimation Module

The downlink throughput from the base station 2 to the mobile communication device 1 is predicted based on inputs from recent TTIs from the buffer estimation module 4, scheduling estimation module 5 and the radio quality module 6. According to one embodiment of the present invention, the data from the buffer estimation module 4, scheduling estimation module 5 and the radio quality module 6 is processed by the load estimation module 7 and a throughput module 8 as, for example, seen in FIG. 2. In an alternative embodiment, the downlink throughput is estimated in a throughput module which is configured to perform the function of the estimation load module and throughput load module described with reference to FIG. 2.

The embodiment including the load estimation module will now be described with reference to FIG. 7.

Figure 7:
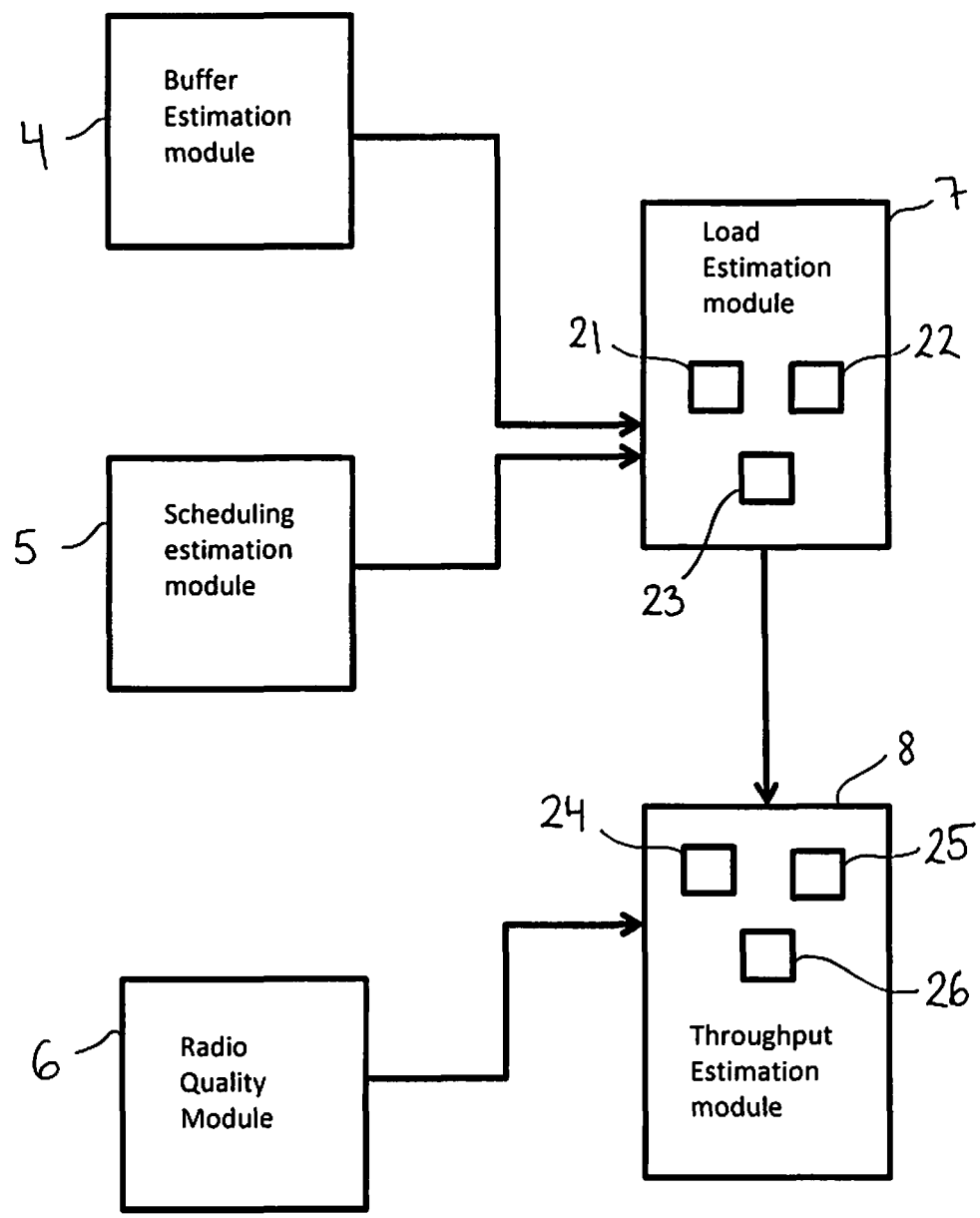
FIG. 7 shows a schematic illustration of an embodiment of the present invention.

FIG. 7 which show a schematic illustration of the buffer estimation module 4, the scheduling estimation module 5, the radio quality module 6, the load estimation module 7 and the throughput module 8.

The load estimation module 7 comprises three sub-modules; a training sub-module 21, a test sub-module 22 and a prediction sub-module 23. The load estimation module 7 analyzes data received from the buffer estimation module 4 and the scheduling estimation module 5.

The training sub-module 21 is configured to develop a model which predicts or estimates the load in a cell of a base station. It does so by machine learning or other mathematical numerical methods, for example the training sub-module may apply algorithms such as linear regression or neural networks.

The training sub-module 21 estimates the load based on data buffer indication and scheduling indication. The training sub-module 21 receives this input in the format of a vector. The size of this vector depends on the number of TTIs that the load estimation module 7 is configured to analyze, and so the greater the number of TTIs the larger the vector. With a greater number of TTIs there is also more information or data for the training sub-module 21 to analyze, which leads to the overall load estimation module 7 to be more accurate. However, it takes longer to process and a user or application requesting the information of throughput may experience a delay.

The training sub-module 21 can be configured to dismiss TTIs where the buffer estimation module 4 estimated that no data is in buffer at the base station. This is because no information about the cell load can be derived from these TTIs.

The output of the training sub-module 21 is a model configured for estimating cell load based on data provided from the buffer estimation module 4 and the scheduling estimation module 5. The estimated cell load can be expressed by different metrics, for example the total cell throughput or the number of active users in the cell.

The test sub-module 22 tests the correctness of the model developed in the training sub-module 21. It does so by running the model on another information or data subset previously received from the buffer estimation module 4 and the scheduling estimation module 5. If the test sub-module 22 determines that the margin of error is too large, it could be configured to report back to the training sub-module 21. The training sub-module 21 and the test sub-module 22 may be configured to run continuously so as to provide an optimized system.

When the training sub-module 21 with help from the test sub-module 22 has developed a model with sufficient accuracy, the prediction sub-module 23 applies the developed model to new information or data received from buffer estimation module 4 and the scheduling estimation module 5 so as to estimate the load of a cell. Similar to the training sub-module 21, the prediction sub-module 23 may express the cell load by different metrics, for example the number of active users in the cell. The estimated cell load is referred to as cell load information.

In an embodiment where the load estimation module 7 is hardware implemented, its data input 15d receives data buffer indication and scheduling indication from the data output 16a, 16b of the buffer estimation module 4 and the scheduling estimation module 5. After the load estimation module 7 has processed the data buffer indication and scheduling indication as described above, it transmits the cell load information to the data input 15e of the throughput estimation module 8.

In an alternative embodiment where the load estimation module 7 is software implemented data buffer indication and scheduling indication is provided by the buffer estimation module 4 and the scheduling estimation module 5, respectively, and once the load estimation module 7 has processed the data buffer indication and the scheduling indication it provides the cell load information to the throughput estimation module 8.

In summary, this embodiment relates to the load estimation module 7 for estimating cell load information of the base station. The cell load information may comprise a value indicative of available capacity of a cell of the base station. The load estimation module 7 may receive input from the buffer estimation module 4 and the scheduling estimation module 5. Furthermore, the embodiment includes the load estimation module for developing a prediction model for estimating cell load information based on said input from the buffer estimation module 4 and the scheduling estimation module 5.

The throughput estimation module 8 will now be described with reference to FIG. 7. The throughput estimation module 8 comprises a training sub-module 24, a test sub-module 25 and a prediction sub-module 26.

The training sub-module 24 is configured to develop a model which predicts the downlink throughput. The training sub-module 24 receives input from the load estimation module 7 in terms of load estimation of the cell of the base station that the mobile communication device wishes to connect. The training sub-module 24 also receives input, SINR and Rank values, from the radio quality module 5. The training sub-module 24 maps this information onto a previously estimated cell downlink throughput. The training sub-module 24 develops the module by machine learning or other mathematical numerical methods, for example the training sub-module 24 may apply algorithms such as linear regression or neural networks.

The test sub-module 25 tests the accuracy of the model developed in the training sub-module 24. It does so by running the model on another data subset received from load estimation module 7 and radio quality module 6. If the test sub-module 25 determines that the margin of error is too large, it could be configured to report back to the training sub-module 24. The training sub-module 24 and the test sub-module 25 may be configured to run continuously so as to provide an optimized system.

When the training sub-module 24 and the test sub-module 25 have developed a model with sufficient accuracy, the prediction sub-module 26 applies the developed model to new data received from the load estimation module 7 and the radio quality module 6 so as to estimate the downlink throughput. The downlink throughput may be expressed in Megabytes per second (Mbps).

Advantageously, by the cell load information and the downlink throughput being estimated separately, the cell load information may be reused by another estimation or prediction module or sub-module of a larger system.

In summary, the embodiment relates to the throughput module 8 for predicting downlink throughput from the base station to the mobile communication device based on cell load information from the load estimation module 7 and radio quality indication from the radio quality module 6. This embodiment may also be understood as the throughput module 8 predicting downlink throughput from the base station to the mobile communication device based on data buffer indication from the buffer estimation module 4, scheduling information from the scheduling estimation module 5 and radio quality indication from the radio quality module 6 as the throughput estimation module 8 receives this data directly or indirectly from the buffer estimation module 4, scheduling module 5 and the radio quality module 6.

In addition, the embodiment relates to the load estimation module for developing a prediction model for estimating cell load information based on input from the buffer estimation module 4 and the scheduling estimation module 5.

Figure 8:
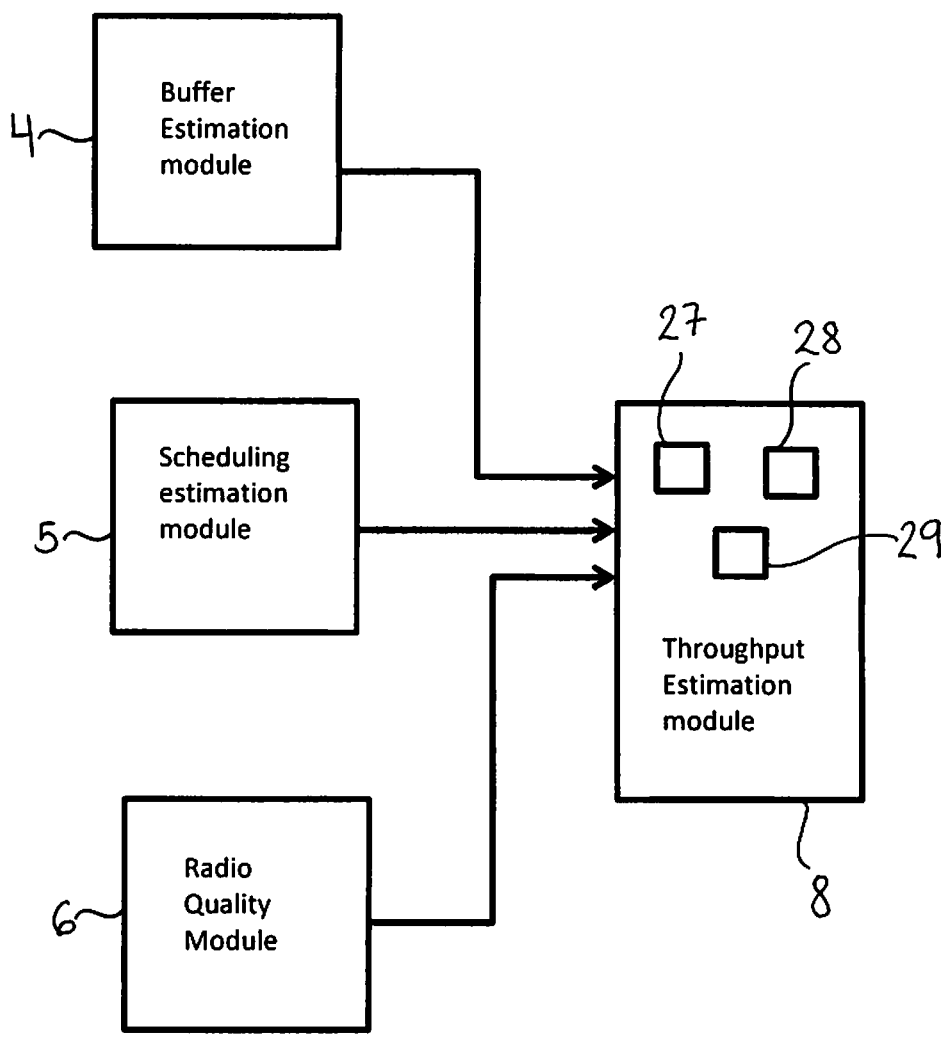
FIG. 8 shows a schematic illustration of another embodiment of the present invention.

FIG. 8 which shows an alternative embodiment, wherein the component 3 comprises the buffer estimation module 4, scheduling estimation module 5, radio quality module 6 and the throughput estimation module 8 will now be described. In this figure the throughput estimation module 8 receives input from the buffer estimation module 4, scheduling estimation module 5 and the quality radio module 6. The throughput estimation module 8 is configured to function as the load estimation module 7 and the throughput estimation module 8 described with reference to FIG. 7.

The throughput estimation module 8 shown in FIG. 8 comprises three sub-modules; a training sub-module 27, a test sub-module 28 and a prediction sub-module 29.

Similar to the throughput estimation module 8 described with reference to FIG. 7, the training sub-module 27 is configured to develop a module a model which predicts the downlink throughput. The training sub-module 27 receives a vector of data output from the buffer estimation module 4, scheduling estimation module 5, and the SINR and Rank values from the radio quality module 6 for a number of TTIs. The throughput estimation module 8 maps the information to a previously estimated cell downlink throughput.

The test sub-module 28 tests the accuracy of the model developed in the training sub-module 27. It does so by running the model on another data subset received from the buffer estimation module 4, scheduling estimation module 5 and radio quality module 6. If the test sub-module 28 determines that the margin of error is too large, it could be configured to report back to the training sub-module 27. The training sub-module 27 and the test sub-module 28 may be configured to run continuously so as to provide an optimized system.

When the training sub-module 27 and the test sub-module 28 have developed a model with sufficient accuracy, the prediction sub-module 29 applies the developed model to new data received from the buffer estimation module 4, scheduling estimation module 5 and the radio quality module 6 so as to estimate the downlink throughput.

Advantageously, by integrating the load estimation into the throughput estimation module 8, a more accurate throughput estimation can be achieved since the correlation between the data buffer indication, scheduling indication and the radio quality information can be used.

In summary, this embodiment relates to the throughput estimation module for predicting downlink throughput from the base station to the mobile communication device based on output from the buffer estimation module 4, scheduling estimation module 5 and the radio quality module 6. The throughput estimation module for developing a prediction model for predicting downlink throughput from the base station to the mobile communication device may be provided.

A method of predicting downlink throughput in a mobile communication network according to an embodiment of the present invention will now be described with reference to FIG. 9.

The method of predicting downlink throughput comprises determining a data buffer indication by estimating if a base station has data buffered for a mobile communication device. This is shown as step 1, S1, in FIG. 9. As mentioned previously, a data buffer indication may be in the form of "yes" or "no" as to whether the base station has data buffered for a mobile communication device. Alternatively, the output data could be a number representing a probability of data being buffered at a base station. For example, the output could be a number between 0 and 1, and there can be a cut off point for example 0.5 where 0-0.49 is interpreted as no data in buffer, and 0.5-1 as data in buffer.

Figure 9:
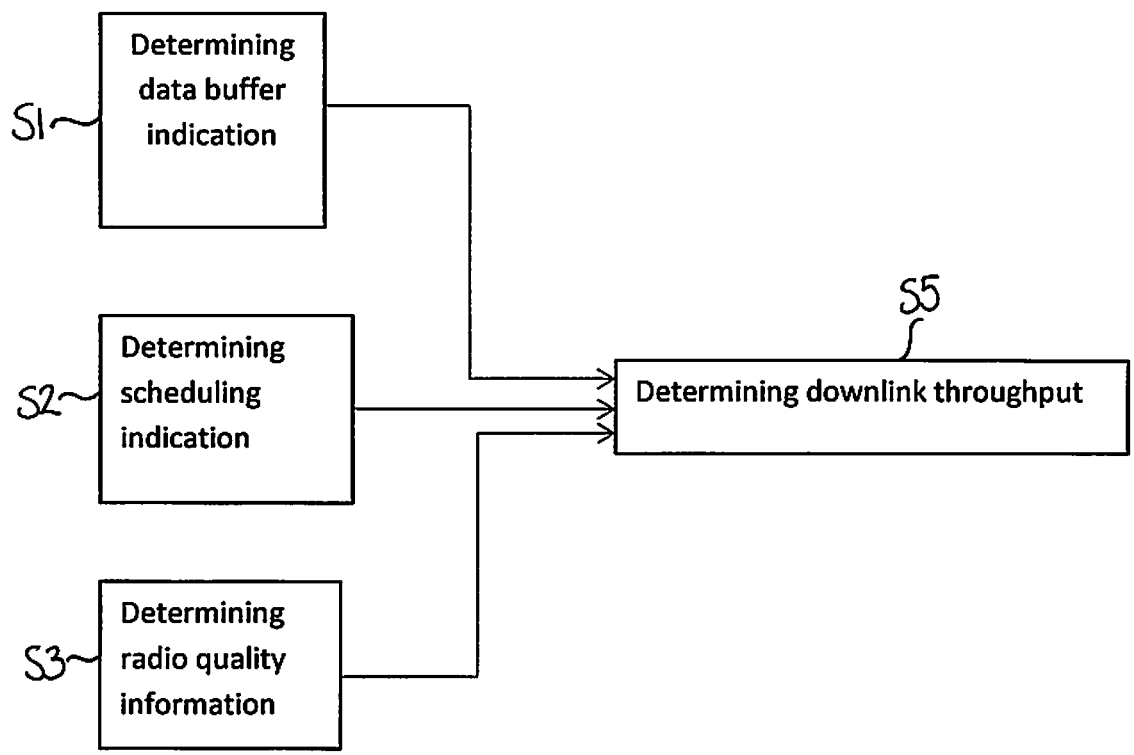
FIG. 9 shows a flow diagram of an embodiment of a method according to the present invention.

The method further comprises determining a scheduling indication, how frequently, or, as to whether, the mobile communication device has previously been scheduled by the base station to receive data from the base station as indicated by step S2 in FIG. 9.

The method also comprises estimating radio quality by determining a radio quality information of a communication channel between a mobile communication device and a base station (step 3, S3).

The method further comprises predicting downlink throughput from the base station to the mobile communication device based on at least the data buffer indication, scheduling indication, and radio quality information as indicated by step 5, S5, in FIG. 9.

It should be understood that step S1, S2 and S3 do not have to be performed in a particular order and so are not limited to the order they are present herein.

Figure 10:
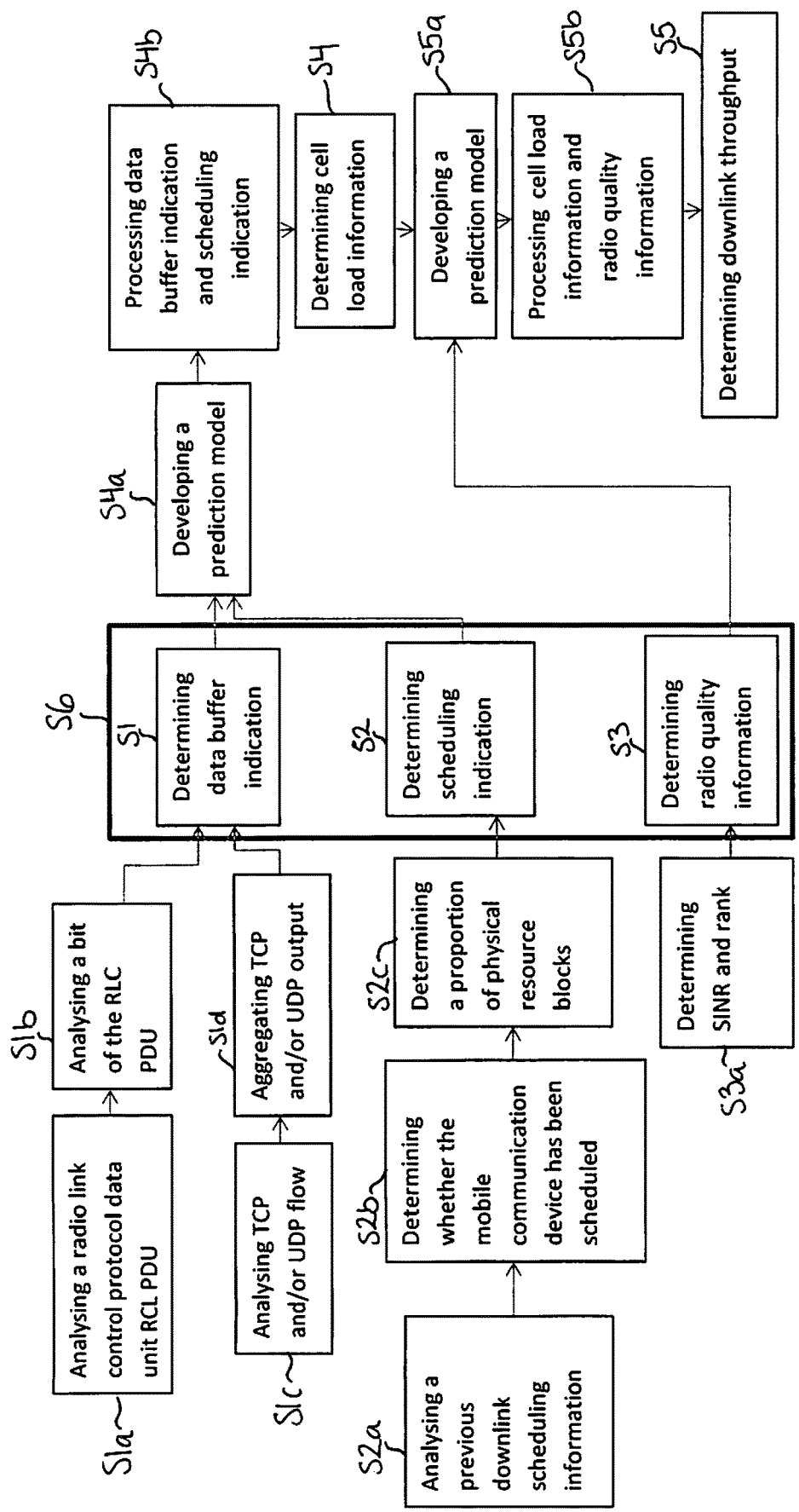
FIG. 10 shows a flow diagram of another embodiment of the present invention.

There are also alternative method steps that will now be described with reference to FIG. 10.

The method may comprise estimating if the base station has data buffered for the mobile communication device by analyzing a radio link control protocol data unit RLC PDU as seen in step S1a. A bit of the RLC PDU may be analyzed which is indicative of an end of a packet data convergence protocol service data unit PDCP SDU. This is shown in step S1b.

The method may alternatively comprise analyzing transmission control protocol TCP and/or user datagram protocol UDP flow from the base station to the mobile communication device so as to estimate if the base station has data buffered for the mobile communication device as shown in step S1c. The method may also comprise aggregating output from the TCP and UDP flow to provide a probability of the base station having data in buffer for the mobile communication device as indicated by step S1d.

The method may also comprise determining the scheduling indication by analyzing previous downlink scheduling information as shown in step S2a. The scheduling indication may be analyzed so as to determining whether the mobile communication device has been scheduled as indicated by step S2b. The previous downlink scheduling information may also be analyzed so to determine a proportion of physical resource blocks assigned to the mobile communication device when it has been scheduled as represented by step S2c.

In one embodiment, the method comprises determining signal to interference plus noise ratio (SINR) and rank value so as to estimate the radio quality as shown by step S3a.

The method may further comprise the determining data buffer indication S1, scheduling indication S2 and radio quality information S3 for at least one transmission time interval TTI as schematically shown by rectangle designated S6

The method may further comprise developing a prediction model for prediction downlink throughput from the base station to the mobile communication device as shown in step S5a.

In one embodiment, the method comprises determining cell load information S4 based on the data buffer indication and the scheduling indication S4b.

The method may also comprise developing a prediction model for estimating cell load information based on the data buffer indication and the scheduling indication as seen in step S4a.

The method may also comprise predicting the downlink throughput from the base station based on the cell load information and the radio quality information S5b. The above method may be implemented in a component such as the component 3 described above. Alternatively, the method may be implemented in a mobile communication device such as the mobile communication device 1 described above. However, the present invention is not limited to being implemented in the component 3 and the mobile communication device 1 described herein. It should be understood that the invention may be implemented in any other suitable hardware. Furthermore, it should be understood that the method described above may be implemented as software, such as computer program instructions, that may be stored in a memory and executable by at least one processor.

An embodiment of a software implementation will now be described with reference of FIG. 11. The computer program may comprise a buffer estimation module 4, a scheduling estimation module 5, a radio quality module 6 and a throughput estimation module 8. These modules may comprise computer program instructions stored in a memory and executable by at least one processor. An example of such a memory and processor is shown in FIG. 4 as described above. When the processor executes the instructions, it determines a data buffer indication by estimating if a base station has data buffered for a mobile communication, determines a scheduling indication comprising frequency at which the base station has been scheduled to send data to the mobile communication device, it estimates radio quality by determining radio quality information of a communication channel between the mobile communication device and the base station, and it predicts downlink throughput from the base station to the mobile communication device based on the data buffer indication, frequency of scheduling and radio quality information.

The memory may further store computer program instructions such that when executed on at least one processor, the processor carries out any of the method steps discussed with reference to FIGS. 10 and/or 11.

Figure 11:
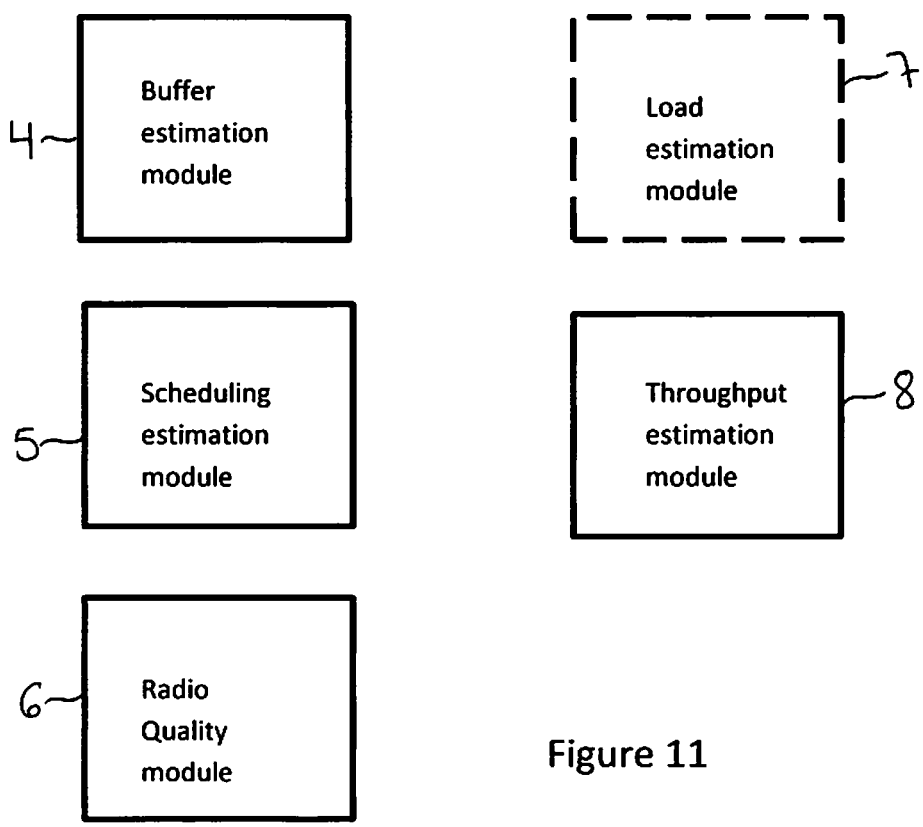
FIG. 11 shows a schematic diagram of an embodiment of the present invention.

In particular, the computer program may further comprise a load estimation module 7 as shown by dashed lines in FIG. 11. The load estimation module may comprise computer program instructions stored in a memory and executable on at least one processor. When the processor executes the instruction it determines cell load information based on the data buffer indication and the scheduling indication. The instructions of the throughput estimation module 8 are thereafter executed by the at least one processor and based on the cell load information and the radio quality information predicts the downlink throughput to the mobile communication device.

Figure 12:
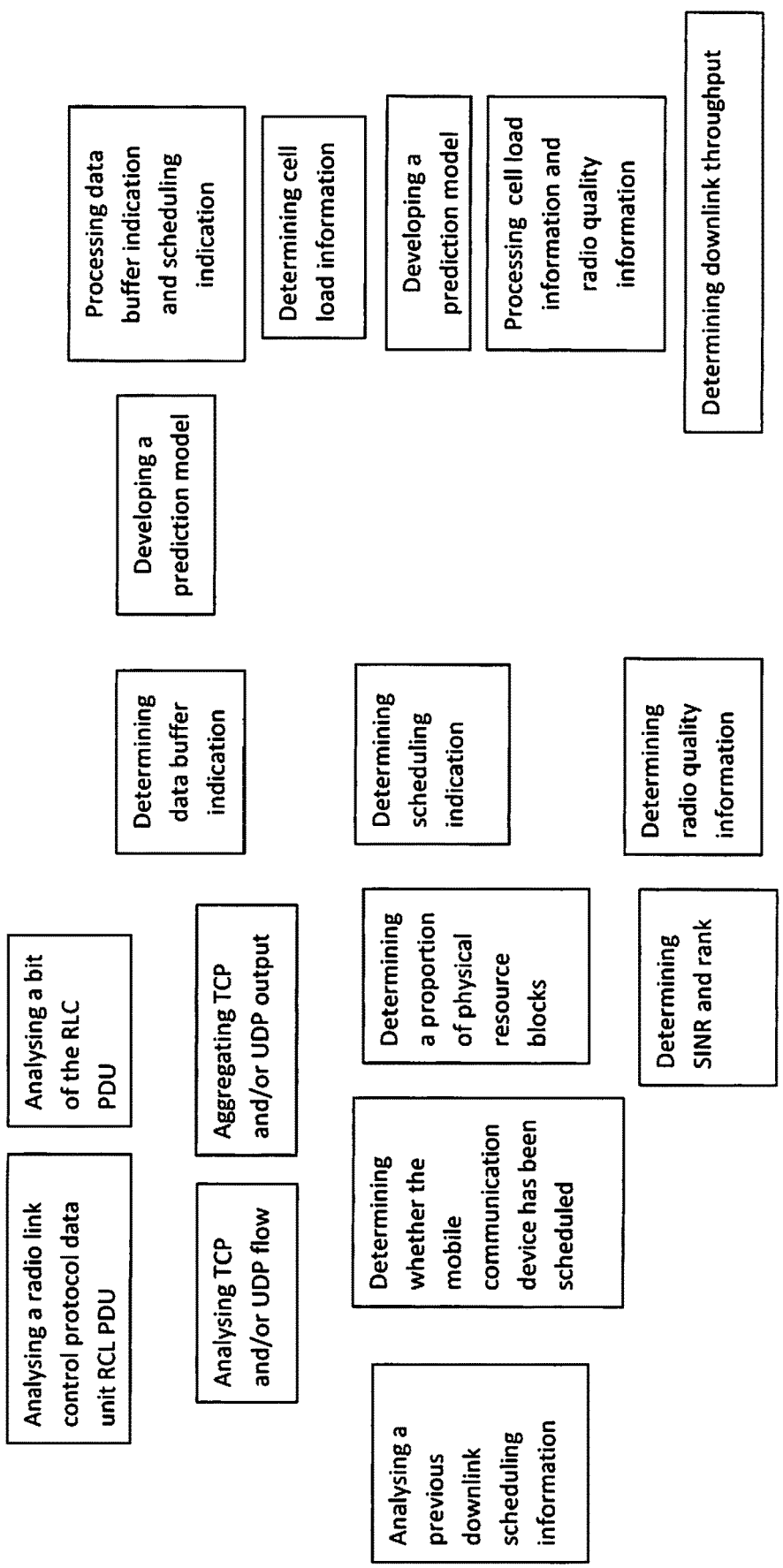
FIG. 12 shows another schematic diagram of an embodiment of the present invention.

FIG. 12 shows further optional computer program instructions that may be stored in a memory and executable on at least one processor.

In one embodiment, an apparatus 3 to predict downlink throughput in a mobile communication network 1 comprising a processor, and a memory, said memory containing instructions executable by said processor is provided. The apparatus 3 is operative to determine a data buffer indication by estimating if a base station has data buffered for a mobile communication, determine a scheduling indication comprising how frequent the mobile communication device has been scheduled to receive data from the base station, estimate radio quality by determining radio quality information of a communication channel between the mobile communication device and the base station; and predict downlink throughput from the base station to the mobile communication device based on at least the data buffer indication, frequency of scheduling and radio quality information.

It should be understood that at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components The advantage of the embodiments of the present invention is that the mobile communication device 1 does not need to request any additional information from the mobile communication network. This is because the bit of the RLC PDU and TLC/UDP flows already form part of the protocol stacks for LTE, and so no additional data needs to be transmitted to the mobile communication device for the buffer estimation module 4 to determine the data buffer indication. Similarly, the scheduling information which is processed by the scheduling estimation module 5 is also already transmitted by the base station to the mobile communication device 1. This is also the case for the radio information, SINR and rank values. These values are already calculated by the mobile communication device 1 in order to establish the radio quality of the communication channel between the base station and the mobile communication device 1. Therefore, the load estimation module 7 and the throughput estimation module 8 do not require any additional data to be sent from the base station to the mobile communication device 1 in order to determine the cell load and the downlink throughput, respectively, and so there is no additional load placed on the mobile communication network avoiding using additional communication resources.

Additionally, the embodiments of the present invention provide the advantage of that no modification of the LTE architecture is required, the embodiments can use data already transmitted according to LTE protocols.

Another advantage of the embodiments of the present invention is that the mobile communication device 1, or the component 3, can predict downlink throughput before the mobile communication device 1 initiates and starts sending data to a base station.

The embodiments of the present invention also provide the advantage that by predicting downlink throughput from the base station to the mobile communication device it can be easier to locate a data bottleneck. For example, if the end-to-end throughput is lower than the predicted downlink throughput from the base station to the mobile communication device as determined by embodiments of the present invention, then it can be determined that the data congestion is before the data reaches the radio access network of the base station.

The embodiments of the present invention can be used for a user of a mobile communication device 1, an application, a service, or the like of the mobile communication device. For example, if the downlink throughput is low, then a user may decide to postpone a voice over internet protocol (VoIP) so as to avoid a low quality call. In one embodiment, the downlink throughput information can be shown to a user on the screen of a mobile device communication. Then the user can use this information to further decide if they want to start a new service. As another example, a service of a mobile communication device may, based on determined downlink throughput being low, to wait to initiate a background download. Similarly, an application on a smart phone may use the downlink throughput to initiate determined by the present embodiments to wait initiating a session until the downlink throughput has reached a particular level so as to get a non-interrupted service. Alternatively, some services may be interested in knowing the potential achievable downlink throughput, in order to optimize service performance, for example, choosing appropriate rate for adaptive video streaming. Alternatively, a service may adapt the resolution of a streamed video individually for each user based on the predict downlink throughput. For example, in adaptive video transmission, the initial data is generally sent at a low bit rate and then increased. The embodiments of the present invention enable a mobile communication device to start sending a video at an optimum bit rate based on the predicted downlink throughput.

The invention claimed is:
1. A user equipment (UE), the UE comprising:
 a buffer estimation module for producing a buffer indication based on an estimation of whether a base station serving the UE has data buffered for the UE;

a scheduling estimation module for determining a scheduling frequency indicator for the UE, which scheduling frequency indicator indicates how frequently the UE has been scheduled to receive data from the base station;

a radio quality module for determining a radio quality indication of a communication channel between the UE and the base station; and a throughput prediction module for predicting downlink throughput from the base station serving the UE to the UE based on, at least, i) the buffer indication produced by the buffer estimation module, ii) the scheduling frequency indicator which indicates how frequently the UE has been scheduled to receive data from the base station, and iii) the radio quality indication determined by the radio quality module.

2. The UE of claim 1, wherein the buffer estimation module for estimating if the base station has data buffered for the UE is for analyzing a radio link control protocol data unit RLC PDU.

3. The UE of claim 2, wherein the buffer estimation module is for analyzing a bit of the RLC PDU which is indicative of an end of a packet data convergence protocol service data unit PDCP SDU.

4. The UE of claim 1, wherein the buffer estimation module is for estimating if the base station has data buffered for the UE by analyzing transmission control protocol TCP and/or user datagram protocol UDP flow from the base station to the UE.

5. The UE of claim 4, wherein the buffer estimation module comprises a TCP sub-module and/or a UDP sub-module for detecting partially received transmission control protocol packets and user datagram protocol packets respectively.

6. The UE of claim 5, wherein the buffer estimation module further comprises an aggregation sub-module for aggregating output from the TCP and UDP sub-modules to provide a probability of the base station having data in buffer for the UE.

7. The UE of claim 1, wherein the scheduling estimation module is for determining how frequently the base station has scheduled the UE to receive data from the base station by analyzing the previous downlink scheduling information and determining whether the UE has been scheduled.

8. The UE of claim 7, wherein the scheduling estimation module is for determining a proportion of physical resource blocks assigned to the UE when it has been scheduled.

9. The UE of claim 1, wherein the radio quality indication comprises signal to interference plus noise ratio (SINR) and rank value.

10. The UE of claim 1, wherein the throughput estimation module is for developing a prediction model for predicting downlink throughput from the base station to the UE.

11. The UE of claim 1, further comprising a load estimation module configured to estimate cell load information of the base station.

12. The UE of claim 11, wherein the cell load information comprises a value indicative of available capacity of a cell of the base station.

13. The UE of claim 11, wherein the load estimation module receives input from the buffer estimation module and the scheduling estimation module.

14. The UE of claim 13, wherein the load estimation module is configured to develop a prediction model for estimating cell load information based on input from the buffer estimation module and the scheduling estimation module.

15. The UE of claim 13, wherein the throughput estimation module is for predicting downlink throughput from the base station to the UE based on the cell load information.

16. The UE of claim 1, wherein the UE is a mobile communication device.

17. A user equipment (UE), the UE comprising:
a processor; and
a memory, said memory containing instructions executable by said processor, wherein the UE is adapted to:
determine a data buffer indication by estimating if a base station serving the UE has data buffered for a mobile communication;
determine a scheduling frequency indicator that indicates how frequently the UE has been scheduled to receive data from the base station;
estimate radio quality by determining radio quality information of a communication channel between the UE and the base station; and
predict downlink throughput from the base station serving the UE to the UE based on at least the data buffer indication, ii) the scheduling frequency indicator, and iii) the radio quality information.

18. The UE of claim 17, wherein the UE is further adapted to determine, based on the predicted downlink throughput, whether or not to postpone a new data session.

19. The UE of claim 17, wherein the UE is further adapted to choose, based on the predicted downlink throughput, a quality level rate for adaptive video streaming.

20. A computer program product comprising a non-transitory computer readable medium storing a computer program comprising instructions which when executed on at least one processor of a user equipment (UE), cause the UE to perform a method comprising:
determining a data buffer indication by estimating if a base station serving the UE has data buffered for the UE;
determining a scheduling frequency indicator that indicates how frequently the UE has been scheduled to receive data from the base station;
estimating radio quality by determining radio quality information of a communication channel between the UE and the base station; and
predicting downlink throughput from the base station serving the UE to the UE based on at least the data buffer indication, ii) the scheduling frequency indicator, and iii) the radio quality information.

* * * * *